Figure 1:
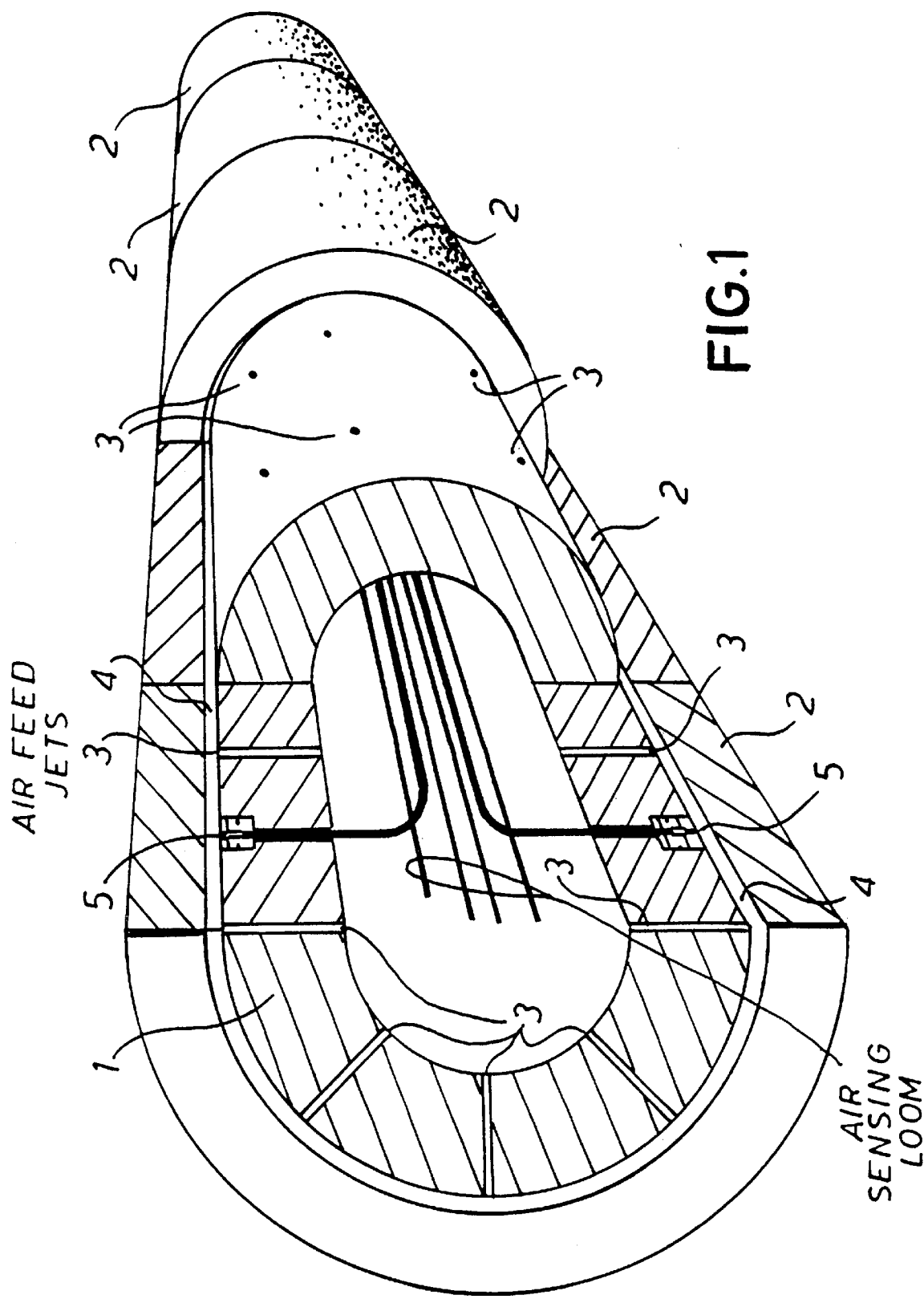

United States Patent
Gillbe

[11] Patent Number: 5,983,707
[45] Date of Patent: Nov. 16, 1999

[54] ROTOR FOR A SHAPEMETER

[75] Inventor: Leo Richard Gillbe, Bournemouth, United Kingdom

[73] Assignee: Kvaerner Technology & Research Ltd., London, United Kingdom

[21] Appl. No.: 09/051,957

[22] PCT Filed: Oct. 17, 1996

[86] PCT No.: PCT/GB96/02562

§ 371 Date: May 19, 1998

§ 102(e) Date: May 19, 1998

[87] PCT Pub. No.: WO97/15409

PCT Pub. Date: May 1, 1997

[30] Foreign Application Priority Data

Oct. 24, 1995 [GB] United Kingdom ............... 9521801

[51] Int. Cl.[6] .................................................. G01B 13/04
[52] U.S. Cl. .......................................... 73/37.7; 73/37.8
[58] Field of Search ................................. 73/37.5–37.9, 73/159; 33/501.02, 533, DIG. 2; 384/276–278, 282, 908, 300, 582

[56] References Cited

U.S. PATENT DOCUMENTS

| | | |
|---|---|---|
| 2,977,788 | 4/1961 | Minix ........................................ 73/37.9 |
| 3,154,939 | 11/1964 | Dabanian et al. ...................... 73/37.9 |
| 4,967,465 | 11/1990 | Frank. | |

*Primary Examiner*—Robert Raevis
*Attorney, Agent, or Firm*—Fay, Sharpe, Fagan, Minnich & McKee, LLP

[57] ABSTRACT

A rotor for a shapemeter is shown in the figure and comprises an inner annulus (6) connected to and spaced from a coaxial outer annulus (7) by means of rubber o-rings (10). The air gap formed between the annuli (6, 7) and the rubber o-rings (10) provide a thermal barrier which greatly alleviates heat transfer between the inner and outer annuli (6, 7) and allows the annuli to be made of materials with different coefficients of thermal expansion. In consequence the inertia of the rotor can be minimised and the thermal stability of the rotor enhanced so that shapemeters using the rotor have improved sensitivity.

10 Claims, 2 Drawing Sheets

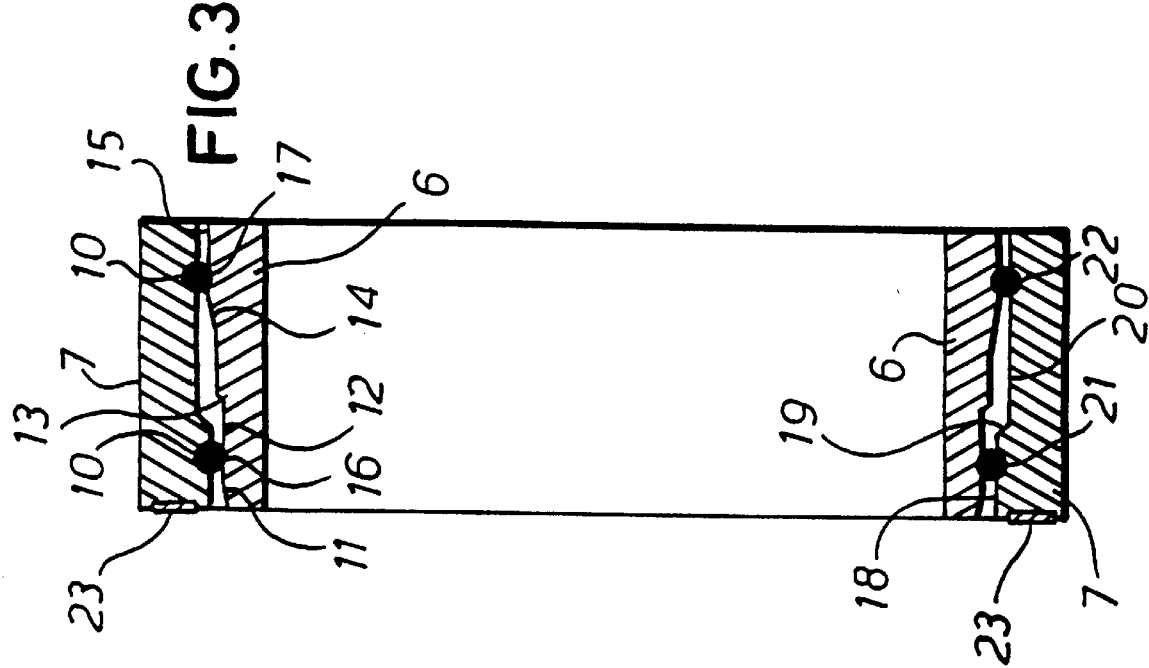
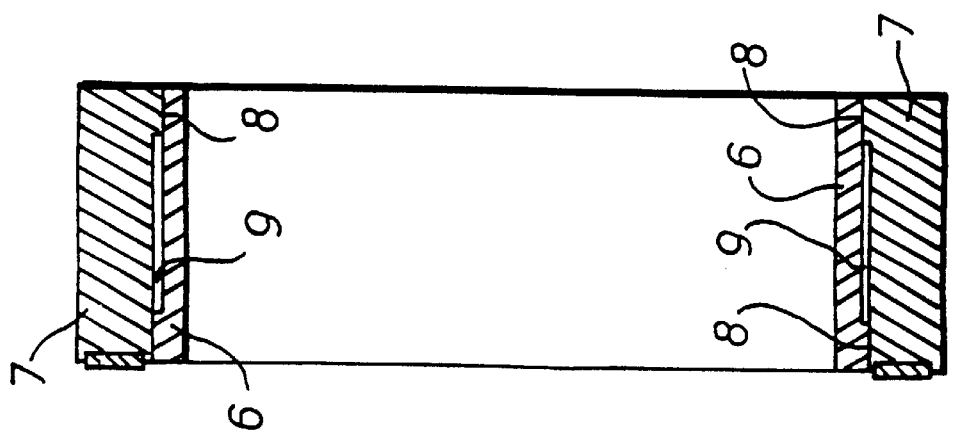

ROTOR FOR A SHAPEMETER

The present invention is concerned with the construction and operation of shapemeters and particularly the rotor of a shapemeter for sensing the shape of an elongate strip of material in a process line, for example a line for rolling metal strip, plastics or paper. During rolling the strip is subject to tension and pressing by the action of rollers. If the tension or pressing applied to the strip is not uniform across the width of the strip the thickness and length of the strip will be non-uniformly altered across its width resulting in flatness defects, waste and consequent loss of productivity. It is therefore necessary to sense the shape of the strip in the line.

FIGS. 1 and 2 illustrate a prior art shapemeter, while FIG. 3 illustrates the invention.

A form of prior art shapemeter is illustrated in FIG. 1 and is sometimes known as a "vidimon" (registered trade mark) shapemeter. This shapemeter comprises a fixed arbor 1 upon which several rotors 2 of similar diameter are mounted along its axis. The arbor 1 includes a manifold to distribute compressed air to air feed jets 3 and so to an annular space 4 between the arbor 1 and the inner surface of each rotor 2 to form an air bearing. In use the outer surface of each rotor is carried into contact with a surface of the strip as the strip moves longitudinally through the line. Any change in the length of a width portion of the strip changes the position of the rotor 2 engaged with that portion of the strip and causes a corresponding change in the pressure of the air cushion supporting that rotor. This pressure change is sensed by transducers connected to air pressure measuring ports 5 via an air sensing loom in the arbor. The sensed air pressure is signalled to a data processor and this data may then be used to control process parameters in the line such as roll profile to rectify any undesired deformation of the strip.

FIG. 2 shows a conventional rotor 2 for a shapemeter. The conventional rotor 2 is formed from an inner annulus 6 and an outer annulus 7. This allows the inner annulus 6 to be formed of a soft material which will not damage the arbor 1 if the air supply to the bearing fails so that the rotor 2 contacts the arbor 1 at speed. The inner and outer annuli are secured together by means of an interference fit 8 at their axial ends. This allows a thermally insulating space 9 to be formed between the inner and outer annuli and so to improve the thermal stability of the rotor.

The speed of strip process lines has increased substantially since the development of the conventional shapemeter described above. In consequence the sensitivity demanded of shapemeters in modern lines has also increased. There is now a demand for a shapemeter of improved sensitivity and thermal stability.

Accordingly the present invention provides a rotor for a shape meter comprising an inner annulus and an outer annulus, said annuli being coaxially engaged by at least two O-rings engaging coaxially in a space formed between the outer surface of the inner annulus and the inner surface of the outer annulus.

Further according to the present invention there is provided a shapemeter comprising a rotor according to the preceding paragraph.

The use of o-rings to connect the inner and outer annuli of the rotor allows the rotor to be formed with a reduced thermal conductance between the inner and outer annuli. Ordinarily the o-rings will be the only contact between the inner and outer annuli. Because of the thermal stability provided by the rotor according to the invention the shapemeter can have the same calibration characteristics over its full working temperature range.

For the purpose of this specification the term o-ring is to be understood to include not only continuous rings of constant cylindrical section but also rings of non-cylindrical section, such as triangular, square or more complex section.

The prior art annuli needed to have similar thermal properties to avoid intolerable thermal stresses during use. The thermal barrier provided by the use of the o-rings allows materials of widely varying thermal properties to be used, for example with very different coefficients of thermal expansion. By virtue of the present invention the materials of the inner and outer annuli and the large internal space between the annuli can be optimised for minimal rotor mass/inertia so enhancing the sensitivity of the shapemeter in which it is used.

The o-rings may be of any suitable material according to the materials of the annuli, however, o-rings of a rubber compound which vulcanises when subject to heat are useful in applications such as rolling aluminium strip.

Preferably each of the outer surface of the inner annulus and the inner surface of the outer annulus is provided with annular grooves each axially spaced to receive one of the O-rings.

Preferably the grooves in the outer annulus are deeper than the grooves in the inner annulus whereby the o-rings can be seated one each in each groove in the outer annulus and retained while the inner annulus is axially inserted into the outer annulus until the o-rings seat one each in each groove in the inner annulus.

The surface of the grooves may be roughened to provide a key for the o-rings.

The inner and outer surfaces of the annuli may be provided with conical portions to assist in the installation of the inner annulus into the outer annulus.

Preferably the inner annulus is of a softer material to the outer annulus.

The inner annulus may be of lead/bronze alloy and the outer annulus may be of carbon/steel alloy to adapt the rotor for use in shapemeters in the metals industry.

The inner surface of the inner rotor may be coated with a low friction material such as Polytetraflouroethylene (PTFE) to provide an emergency bearing surface.

One of the major advantages of the present invention is that the rotor embodying the invention can be installed on the conventional arbor of a prior art shapemeter which can then be recalibrated so that the performance of an existing shapemeter can be substantially improved.

The facility to use a wide range of materials in the construction of the rotor presents the possibility of the shapemeter being adapted for use in a greater range of applications than was previously possible.

The use of o-rings makes assembly of the annuli into rotors simpler by obviating the interference fits required of conventional annuli.

The rotors in a shapemeter require regular replacement. Conventionally the old rotors are refurbished and reused. Refurbishment requires disassembly of the rotors and this may be simpler with the rotor according to the present invention.

A rotor for a shapemeter embodying the present invention will now be described with reference to the accompanying FIG. 3 which shows a sectional elevation through the rotor.

The rotor embodying the invention comprises an inner annulus 6, an outer annulus 7 and a pair of axially spaced o-rings 10. The outer surface of the inner annulus 6 comprises a first portion 11 which is frusto-conical and has a conic angle of about 15°. The first portion connects with a second portion 12 which is of constant radius and connects to a shoulder 13. The shoulder 13 connects with a third portion 14 which is frusto-conical and has a cone angle of about 10°. The third portion 14 connects with a fourth and final portion 15 of constant radius. A shallow annular groove 16 is formed in the second portion 12 and a similar shallow annular groove 17 is formed in the fourth portion.

The inner surface of the outer annulus 7 consists of a first section 18 of constant radius connected to a radially outwardly extending shoulder 19 which is connected to a second section 20 of constant radius. A first deep groove 21 is provided in the first section 18 and a second deep groove 22 is provided in the second section 20.

The rotor is assembled by locating the o-rings 10 one each into each deep groove 21, 22. The inner annulus is then pushed into the bore in the outer annulus 7 until the o-rings 10 seat one each in each of the shallow grooves 16, 17.

The o-rings are preferably made from a material such as a synthetic rubber which vulcanises (hardens) upon heating and working. Thus, the o-rings are softly resilient during assembly but are hardened during use thus making assembly easy. Examples of suitable O-ring materials are the flouroelastomers sold under the registered trademarks "VITON" "TECNOFLON" and "FLUOREL". An alternative o-ring structure is a small diameter helix of very fine guage stainless steel wire formed into a toroidal o-ring.

The grooves 16, 17, 21, 22 are roughened to provide a surface key for the o-rings 10 so that they do not slip circumferentially.

Spacer pads 23 are seated in recesses in one end of the outer annulus 7 to separate each rotor during use.

The materials from which the inner and outer annuli are made will be selected according to the application for which the rotor is intended and to keep the inertia of the rotor to a minimum. Thus, for shapemeters intended for sensing the shape of aluminium strip in a rolling line the outer annulus 7 will preferably be formed of carbon steel alloy to be hard wearing. The inner annulus may be formed from a lead/bronze alloy which is soft and so protects the arbor in the event of the air supply failing. Aluminium and Polytetraflouroethylene (PTFE) are alternative materials from which the inner annulus may be constructed. PTFE may be used as a coating on the inner surface of the inner annulus 6. The shapemeter may be useful in sensing the shape of paper or plastics strip. In the case of paper the outer annulus may be of ceramic material.

The rotor according to the invention can be used to replace the prior art rotors 2 shown in FIG. 1 to produce a new shapemeter with improved sensitivity.

I claim:

1. A rotor for a shape meter comprising an inner annulus (6) and an cuter annulus (7), said annuli (6,7) being coaxially engaged characterised in that said engagement is achieved by at least two O-rings (10) engaging coaxially in a space formed between the outer surface of the inner annulus (6) and the inner surface of the outer annulus (7).

2. A rotor according to claim 1 wherein the O-rings (10) are comprised of a rubber material which is vulcanised by the heat to which the rotor is subjected during use.

3. A rotor according to claim 1 wherein each of the outer surface of the inner annulus (6) and the inner surface of the outer annulus (7) is provided with annular grooves (16, 17, 21, 22) each axially spaced to receive one of the O-rings.

4. A rotor according to claim 3 wherein the grooves (21,22) in the outer annulus (7) are deeper than the grooves (16,17) in the inner annulus (6) whereby the o-rings (10) can be seated one each in each groove (21,22) in the outer annulus (7) and retained while the inner annulus (6) is axially inserted into the outer annulus (6) until the o-rings (10) seat one each in each groove (16,17) in the inner annulus (6).

5. A rotor according to claim 3 wherein the surface of the grooves (16, 17, 21, 22) is roughened to provide a key.

6. A rotor according to claim 1 wherein the inner and outer surfaces of the annuli (6,7) are provided with conical portions (11, 13, 14) to assist in the installation of the inner annulus (6) into the outer annulus (7).

7. A rotor according to claim 1 wherein there is no contact between the inner and outer annuli (6, 7) except via the O-rings (10).

8. A rotor according to claim 1 wherein the inner annulus (6) is of a softer material than the outer annulus (7).

9. A rotor according to claim 8 wherein the inner annulus (6) is of lead/bronze alloy and the outer annulus (7) is of carbon/steel alloy to adapt the rotor for use in shapemeters in the metals industry.

10. A rotor according to claim 1 wherein the inner surface of the inner rotor (6) is coated with Polytetrafluoroethylene (PTFE) to provide an emergency bearing surface.

* * * * *